(12) United States Patent
Toko et al.

(10) Patent No.: US 10,808,904 B2
(45) Date of Patent: Oct. 20, 2020

(54) LAMP UNIT, VEHICULAR LAMP SYSTEM

(71) Applicant: STANLEY ELECTRIC CO., LTD., Tokyo (JP)

(72) Inventors: Yasuo Toko, Tokyo (JP); Yoshihisa Iwamoto, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 16/505,739

(22) Filed: Jul. 9, 2019

(65) Prior Publication Data

US 2020/0032977 A1 Jan. 30, 2020

(30) Foreign Application Priority Data

Jul. 24, 2018 (JP) ................. 2018-138256

(51) Int. Cl.
*G02F 1/1335* (2006.01)
*G02F 1/1337* (2006.01)
(Continued)

(52) U.S. Cl.
CPC ............. *F21S 41/645* (2018.01); *F21S 41/20* (2018.01); *G02F 1/13363* (2013.01);
(Continued)

(58) Field of Classification Search
CPC ............. G02F 1/1333; G02F 1/133362; G02F 1/13363; G02F 1/133528; G02F 1/133634; G02F 1/133514; G02F 1/1343; G02F 1/134309; G02F 1/134363; G02F 1/1335; G02F 1/1337; G02F 1/1336; G02F 1/13;
(Continued)

(56) References Cited

U.S. PATENT DOCUMENTS

2004/0156001 A1 * 8/2004 Moriya ............... G02F 1/13363
349/117
2016/0077402 A1 3/2016 Takehara et al.

FOREIGN PATENT DOCUMENTS

| EP | 1 764 644 | 3/2007 |
|----|-----------|--------|
| JP | 2005-183327 A | 7/2005 |
| JP | 5576751 | 8/2014 |

OTHER PUBLICATIONS

European Search Report dated Jan. 2, 2020 in European Patent Application No. 19 187 344.7, 5 pages.

* cited by examiner

*Primary Examiner* — Thoi V Duong
(74) *Attorney, Agent, or Firm* — Xsensus LLP (57) ABSTRACT

To obtain projection images with high contrast when selective light irradiation is performed forward of its own vehicle. A lamp unit for a vehicular lamp system performing selective light irradiation to the surroundings of the own vehicle includes: a light source; an optical shutter part that modulates light emitted from the light source; and an optical system that projects the light transmitted through the optical shutter part. The optical shutter part includes: polarizers; a liquid crystal element disposed between the polarizers and where the initial alignment of liquid crystal molecules is horizontally aligned and causes an alignment change in the in-plane direction upon electric field application; a first optical plate which is a positive A-plate disposed between the polarizers closer to the light source and the liquid crystal element; and a second optical plate which is a positive C-plate disposed between the first optical plate and the liquid crystal element.

7 Claims, 7 Drawing Sheets

(51) Int. Cl.
  *F21S 41/64*      (2018.01)
  *F21S 41/20*      (2018.01)
  *G02F 1/13363*    (2006.01)
  *B60Q 1/14*       (2006.01)

(52) U.S. Cl.
  CPC .......... *G02F 1/133528* (2013.01); *B60Q 1/14* (2013.01); *B60Q 2300/142* (2013.01); *B60Q 2300/41* (2013.01); *G02F 2001/133531* (2013.01); *G02F 2001/133638* (2013.01); *G02F 2001/133738* (2013.01); *G02F 2001/133742* (2013.01); *G02F 2413/02* (2013.01); *G02F 2413/06* (2013.01); *G02F 2413/11* (2013.01)

(58) Field of Classification Search
  CPC .. G02F 1/133526; G02F 1/13471; G02F 1/29; G02F 2413/11; G02F 2413/02; G02F 2413/13; G02F 2413/12; G02F 2413/06; G02F 2413/14; G02F 2001/133638; G02F 2001/133742; G02F 2001/133631; G02F 2001/133738; G02F 2001/291; G02F 2203/12; G02B 1/041; G02B 5/3025; B60Q 1/14; B60Q 2300/41; B60Q 2300/42; F21S 41/645; F21S 41/20; F21W 2102/00; F21W 2107/10
  See application file for complete search history.

Isoluminance contour

LAMP UNIT, VEHICULAR LAMP SYSTEM

CROSS-REFERENCE TO RELATED APPLICATION

The present application claims priority to JP 2018-138256 filed Jul. 24, 2018, the entire contents of which are incorporated herein by reference.

BACKGROUND OF THE INVENTION

Field of the Invention

The present invention relates to a technique for irradiating light to the periphery of a vehicle (for example, the front of a vehicle), and more particularly to a technique for selectively irradiating light depending on the presence or absence of a target object such as an oncoming vehicle or a preceding vehicle.

Description of the Background Art

Japanese Unexamined Patent Application Publication No. 2005-183327 describes a vehicle headlight capable of forming a plurality of light distribution patterns. The vehicle headlight includes a light emitting part using LEDs, and a light shielding part that blocks a portion of light emitted forward from the light emitting part to form a cutoff suitable for its light distribution pattern. The light shielding part includes an electro-optical element having a light control function and a control part for dimming-controlling the electro-optical element. And, a liquid crystal element is used as the electro-optical element, for example.

Here, when controlling the light irradiated to the front of the vehicle using the configuration as described above, since the light emitted from the LEDs of the light emitting part advances in a wide angular range, even if the headlight is designed such that light is collected using a lens etc. to be incident on the liquid crystal element (electro-optical element) at an angle as narrow as possible, the incident angle of light becomes relatively large in the vertical and the horizontal direction (for example, about ±20° to ±30°).

Thus, the light transmitted through the liquid crystal element is largely dependent on the viewing angle, and there is room for improvement in that the contrast of the projected image (the light distribution pattern) formed by the use of this light is reduced.

In a specific aspect, it is an object of the present invention to provide a technique capable of obtaining a projection image with high contrast when performing selective light irradiation forward of a vehicle.

SUMMARY OF THE INVENTION

[1] A lamp unit according to one aspect of the present invention is (a) a lamp unit used for a vehicular lamp system that performs selective light irradiation to the surroundings of a vehicle including: (b) a light source; (c) an optical shutter part that modulates light emitted from the light source; and (d) an optical system that projects the light transmitted through the optical shutter part; (e) where the optical shutter part includes: (e1) a pair of polarizers; (e2) a liquid crystal element disposed between the pair of polarizers and in which the initial alignment of liquid crystal molecules is horizontally aligned and causes an alignment change in the in-plane direction upon application of an electric field; (e3) a first optical plate which is a positive A-plate disposed between one of the pair of polarizers closer to the light source and the liquid crystal element; and (e4) a second optical plate which is a positive C-plate disposed between the first optical plate and the liquid crystal element.

[2] A lamp unit according to one aspect of the present invention is (a) a lamp unit used for a vehicular lamp system that performs selective light irradiation to the surroundings of a vehicle including: (b) a light source; (c) an optical shutter part that modulates light emitted from the light source; and (d) an optical system that projects the light transmitted through the optical shutter part; (e) where the optical shutter part includes: (e1) a pair of polarizers; (e2) a first liquid crystal element disposed between the pair of polarizers and in which the initial alignment of liquid crystal molecules is horizontally aligned and causes an alignment change in the in-plane direction upon application of an electric field; (e3) a second liquid crystal element disposed between the pair of polarizers and the initial alignment of liquid crystal molecules of the second liquid crystal element is vertically aligned or substantially vertically aligned; (e4) a first optical plate which is one of a positive A-plate, a negative A-plate, a positive biaxial plate or a negative biaxial plate, disposed between one of the pair of polarizers closer to the light source and the first liquid crystal element or the second liquid crystal element; and (e5) a second optical plate which is a negative C-plate disposed between the first optical plate and the first liquid crystal element or the second liquid crystal element.

[3] A vehicular lamp system according to one aspect of the present invention is a vehicular lamp system including: (a) the lamp unit; (b) a detecting part for detecting a target object present surrounding the vehicle; and (c) a driving part which sets the light distribution pattern according to the position of the target object and drives the lamp unit.

According to the above configuration, it is possible to obtain a projection image (a light distribution pattern) with high contrast when selective light irradiation is performed forward of the vehicle.

DESCRIPTION OF THE PREFERRED EMBODIMENTS

Embodiment 1

Figure 1:
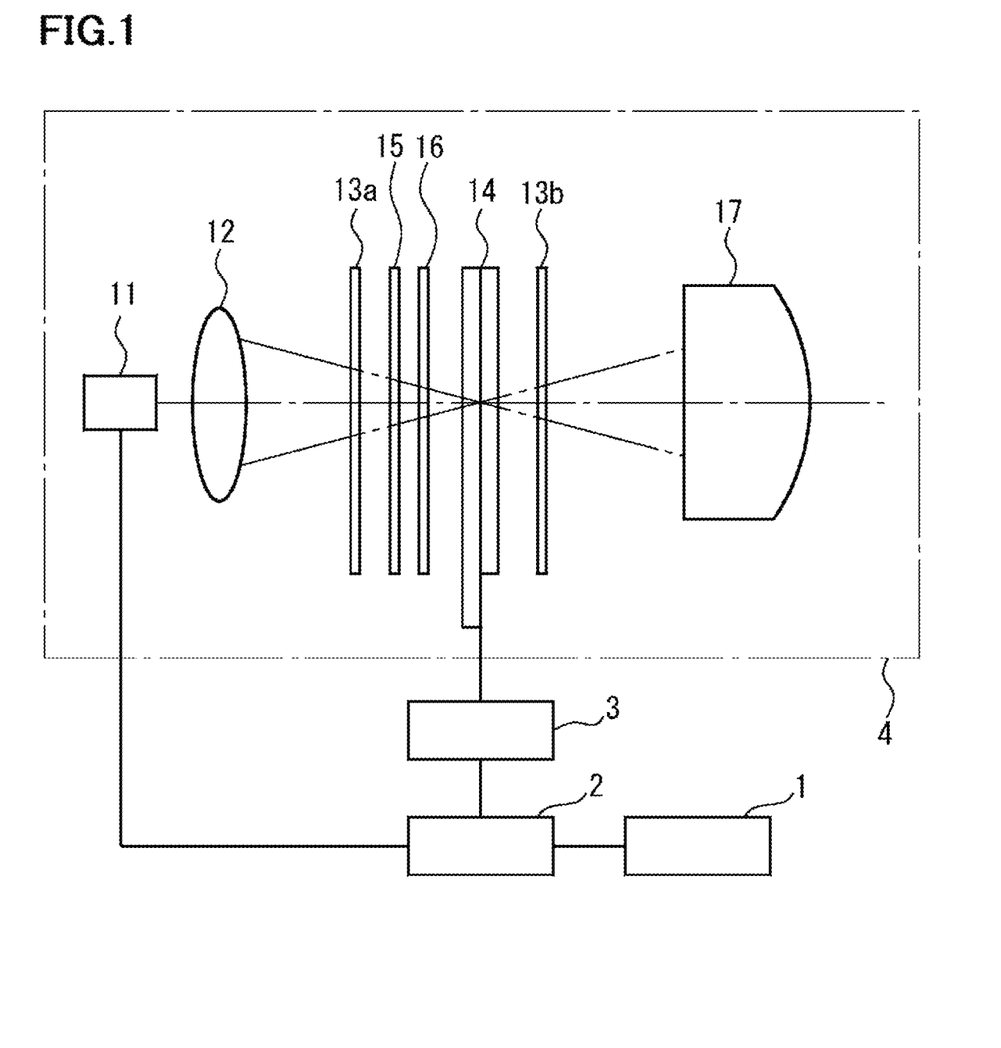
FIG. 1 is a diagram showing the configuration of a vehicular lamp system according to embodiment 1.

FIG. 1 is a diagram showing the configuration of a vehicular amp system according to embodiment 1. In the vehicular lamp system shown in FIG. 1, based on an image of the surroundings (for example, the front) of an own vehicle taken by a camera 1, an image recognition process is performed and the presence or absence of a target object (for example, an oncoming vehicle, a preceding vehicle, a pedestrian, etc.) is detected by a control part 2. Then, according to the position of the target object, a liquid crystal element 14 of a lamp unit 4 is controlled and selective light irradiation is performed by a liquid crystal driving part 3. Here, in the present embodiment, the camera 1 and the control part 2 correspond to "a detection part", and the control part 2 and the liquid crystal driving part 3 correspond to "a driving part".

The camera 1 is disposed at a predetermined position (for example, the upper portion of the windshield) in the own vehicle, and captures an image in front of the own vehicle. The control part 2 is realized, by executing a predetermined operation program in a computer system having CPU, ROM, RAM and the like, for example. The liquid crystal driving part 3 generates a driving voltage for driving the liquid crystal element 14 based on the control signal supplied from the control part 2 and provides the driving voltage to the liquid crystal element 14.

The lamp unit 4 is disposed at the front part of the vehicle for light irradiation, and is configured to include a light source 11, a condensing lens (a condensing optical system) 12, a pair of polarizers 13a, 13b, a liquid crystal element 14, an optical plate 15, an optical plate 16, and a projection lens (an imaging projection optical system) 17. In the present embodiment, the pair of polarizers 13a, 13b, the liquid crystal element 14, the optical plate 15, and the optical plate 16 correspond to "an optical shutter part."

The light source 11 includes light emitting elements such as LEDs and a driver, for example, and supplies a driving current from the driver to the light emitting elements according to a control signal from the control part 2, and emits light from the light emitting elements.

The condensing lens 12 collects relatively wide-angle light emitted from the light source 11 and causes the light to be incident on the liquid crystal element 14. Here, the condensing optical system may be configured by using a reflector instead of the condensing lens, or the condensing optical system may be configured by combining the condensing lens and the reflector.

The pair of polarizers 13a and 13b are disposed to face each other with the liquid crystal element 14, etc. interposed there between. As these polarizers 13a and 13b, for example, absorption type polarizers (iodine type, dye type, etc.) using an organic material may be used, or a wire grid polarizer formed by thin metal wires on a transparent substrate may be used, or these may be used in combination. With regard to the wire grid polarizer, it is desirable to use a polarizer in which the surface reflection is suppressed by an optical multilayer film or the like.

The liquid crystal element 14 is driven by a driving voltage supplied from the liquid crystal driving part 3 to modulate light incident from the light source 11 through the condensing lens 12 or the like. The liquid crystal element 14 has a plurality of light modulation regions (pixel regions), and can modulate light for each light modulation region. In this embodiment, as the liquid crystal element 14, an in-plane switching type liquid crystal element in which the alignment direction of liquid crystal molecules of the liquid crystal element changes within a plane (in a plane parallel to the substrate surface) according to an applied voltage is used. Detailed configuration of the liquid crystal element 14 will be described later (refer to FIG. 3).

The optical plate 15 is a positive A-plate, and is disposed between the polarizer 13a and the liquid crystal element 14 and is on the side closer to the polarizer 13a. Here, the refractive indices in the three directions of the optical plate are defined as nx, ny, and nz where nx is the refractive index in the slow axis direction within the plane of the optical plate, ny is the refractive index in the fast axis direction orthogonal to nx, and nz is the refractive index in the thickness direction of the optical plate orthogonal to nx and ny. Further, Nz factor is defined as Nz=(nx−nz)/(nx−ny). Using theses definitions, the positive A-plate is expressed as an optical plate where Nz=1.

The optical plate 16 is a positive C-plate and is disposed between the polarizer 13a and the liquid crystal element 14 and is on the side closer to the liquid crystal element 14. Here, when using the definition of the optical plate described above, the positive C-plate is expressed as an optical plate where Nz factor is negative infinity (Nz=−∞).

Here, a viewing angle compensator in which Nz factor is infinity (Nz=∞) (nx≈ny>nz) is called a negative C-plate. A viewing angle compensator in which Nz factor is greater than 1 (nx>nv>nz) is called a biaxial plate having negative biaxial optical anisotropy or simply a negative biaxial plate. A viewing angle compensator in which Nz factor is approximately 1 (nx>nv≈nz) is called a positive A-plate. Further, a viewing angle compensator having a Nz factor smaller than 1 is mainly referred to as a biaxial plate having positive biaxial optical anisotropy or simply a positive biaxial plate. On the other band, a viewing angle compensator in which Nz is approximately 0 (nz≈nx>ny) is called a negative A-plate, and a viewing angle compensator in which Nz is negative infinity (Nz=−∞)(nz>nx≈ny) is called a positive C-plate. Further, in this specification, if the in-plane retardation Re where Re=(nx−ny)×d (d: thickness of the viewing angle compensator) is 7 nm (nano-meter) or less, then it is regarded and treated as a negative C-plate. Further, the thickness direction retardation Rth is defined as Rth=((nx+ny)/2−nz)×d.

The projection lens 17 is arranged so that light modulated by the liquid crystal element 14 and transmitted through the polarizer 13b can be incident. As the projection lens 17, for example, a reversed projection type projector lens having a focal point at a specific distance is preferably used. In this case, N/A of the lens is designed in accordance with the angle of the incident light. Assuming that θ is the maximum angle between the incident light and the center line of the projection lens 17, N/A of the lens is designed such that N/A=sin θ. It is desirable that the liquid crystal element 14 described above be disposed near the focal point of the projection lens 17.

In this lamp unit 4, for each light modulation region of the liquid crystal element 14, light is modulated, and the modulated light is emitted through the polarizer 13b and is projected by the projection lens 17, thereby allowing various light distribution patterns (projected images) to be formed in front of the own vehicle. For example, it is possible to form a light distribution pattern in which the region where the preceding vehicle and the oncoming vehicle exist is shielded or dimmed, and the other region is irradiated with light.

Figure 2:
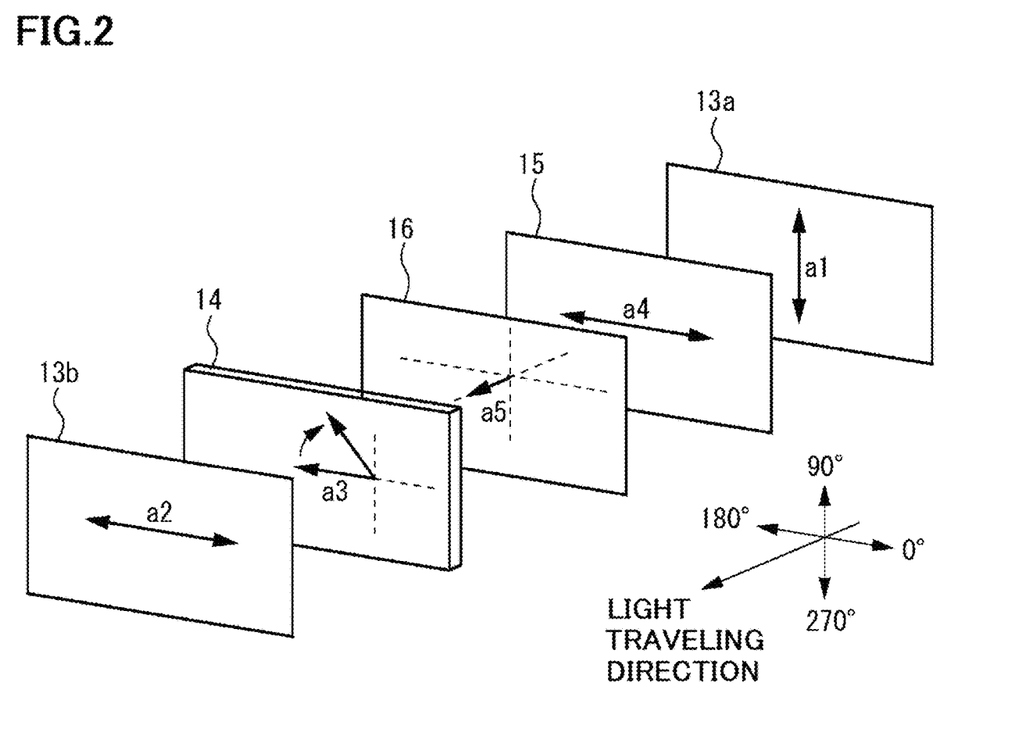
FIG. 2 is a diagram for explaining the optical axes arrangement of the liquid crystal element, each of the optical plates, and each of the polarizers.

FIG. 2 is a diagram for explaining the optical axes arrangement of the liquid crystal element, each of the optical plates, and each of the polarizers. Here, as shown in the figure, the horizontal direction of the liquid crystal element is represented as an angle of 0°-180°, and the vertical direction is represented as an angle of 90°-270°. The pair of polarizers 13a and 13b are arranged such that their absorption axes a1 and a2 are substantially orthogonal to each other. In the present embodiment, the absorption axis a1 of the polarizer 13a disposed on the light incident side (the side closer to the light source 11) is arranged in 90°-270° direction (the vertical direction). Further, the absorption axis a2 of the polarizer 13b disposed on the light emission side (closer to the projection lens 17) is arranged in 0°-180° direction (the horizontal direction). The liquid crystal element 14 is arranged so that the initial alignment direction or the alignment direction a3 of the liquid crystal molecules when no voltage is applied is directed to 180° direction. As shown in the figure, the alignment direction a3 changes so as to approach the 90° direction according to the magnitude of the voltage when the voltage is applied. The optical plate 15 is a positive A-plate as described above, and the slow axis a4 is arranged in 0°-180° direction so that it becomes parallel to the alignment direction a3 of the liquid crystal molecules. The optical plate 16 is a positive C-plate as described above, and is disposed such that its optical axis is in the thickness direction (light traveling direction).

Figure 3:
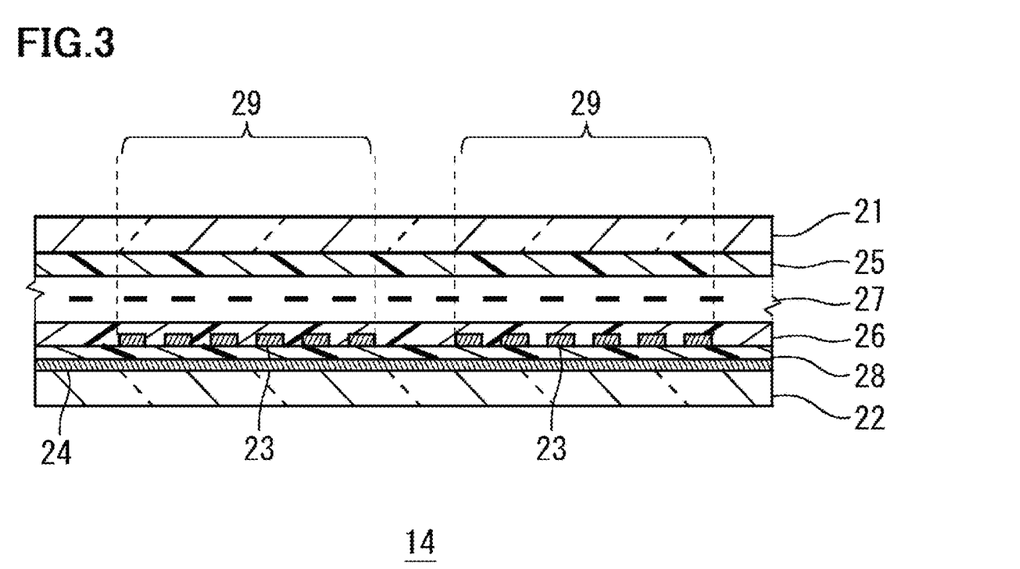
FIG. 3 is a schematic cross-sectional view showing a configuration example of a liquid crystal elemen.

FIG. 3 is a schematic cross-sectional view showing a configuration example of a liquid crystal element. The liquid crystal element 14 is configured to include a first substrate 21 and a second substrate 22 disposed to face each other, a first electrode 23 and a second electrode 24 provided on the second substrate 22, a first alignment film 25 and a second alignment film 26 provided on the first substrate 21 and the second substrate 22 respectively, a liquid crystal layer 27 disposed between the first substrate 21 and the second substrate 22, and an insulating film 28. Although not shown, a color filter may be provided on the first substrate 21 or the second substrate 22.

Each of the first substrate 21 and the second substrate 22 is a rectangular substrate in a plane view, and is disposed to face each other. As each substrate, for example, a transparent substrate such as a glass substrate or a plastic substrate can be used. For example, a large number of spacers are uniformly distributed between the first substrate 21 and the second substrate 22 and these spacers maintain substrate gap at a desired dimension (for example, about several micro meters).

The first electrode 23 and the second electrode 24 are both provided on one surface side of the second substrate 22. The first electrode 23 of the present embodiment is a comb-like electrode having a plurality of electrode branches. And the second electrode 24 is a counter electrode provided substantially on the entire surface of the second substrate 22. As shown in the figure, the insulating film 28 is provided between the second electrode 24 and the first electrode 23. The insulating film 28 is an inorganic insulating film such as a $SiO_2$ film or an organic insulating film, for example. By applying a voltage between the first electrode 23 and the second electrode 24, a fringe electric field can be generated between the two electrodes whereby the alignment direction of liquid crystal molecules of the liquid crystal layer 27 can be changed within a plane parallel to the surface of the second substrate 22. Each of the electrodes is configured by appropriately patterning a transparent conductive film such as indium tin oxide (ITO), for example.

Here, as a method of applying a voltage to the first electrode 23 and the second electrode 24, that is, as a method of driving the liquid crystal element 14, it is possible to appropriately adopt static drive, duty drive, TFT drive or the like, and particularly, static drive is desirable. Further, in the illustrated example, an electrode structure suitable for the fringe field switching (FPS) mode is illustrated, but an electrode structure suitable for the in plane switching (IPS) mode may also be adopted. In that case, for example, both the first electrode 23 and the second electrode 24 are to be comb-like electrodes and be disposed on the same substrate surface.

The first alignment film 25 is provided on one surface side of the first substrate 21. The second alignment film 26 is provided on one surface side of the second substrate 22. As each alignment film, an alignment film which regulates the alignment state of the liquid crystal layer 27 to horizontal alignment is used. Each alignment film is subjected to uniaxial alignment treatment such as rubbing treatment, and has an alignment regulating force in one direction. The direction of the alignment treatment on each alignment film is set to be alternate (anti-parallel), for example.

The liquid crystal layer 27 is provided between the first substrate 21 and the second substrate 22. In this embodiment, the liquid crystal layer 27 contains a flowable nematic liquid crystal material having a positive dielectric anisotropy $\Delta\varepsilon$ and contains no chiral material. Here, a nematic liquid crystal material having a negative dielectric anisotropy $\Delta\varepsilon$ may be used. The liquid crystal layer 27 of this embodiment is arranged so that the alignment direction of the liquid crystal molecules is inclined in one direction when no voltage is applied, and the alignment direction is substantially horizontal with respect to each substrate surface, resulting in a small pretilt angle.

In this liquid crystal element 14, each of the regions capable of changing the alignment direction of the liquid crystal molecules by the electric field generated by the first electrode 23 and the second electrode 24 becomes the light modulation region 29. By individually controlling the state of the transmitted light for each of the light modulation regions 29, a desired light distribution pattern can be obtained.

Figure 4:
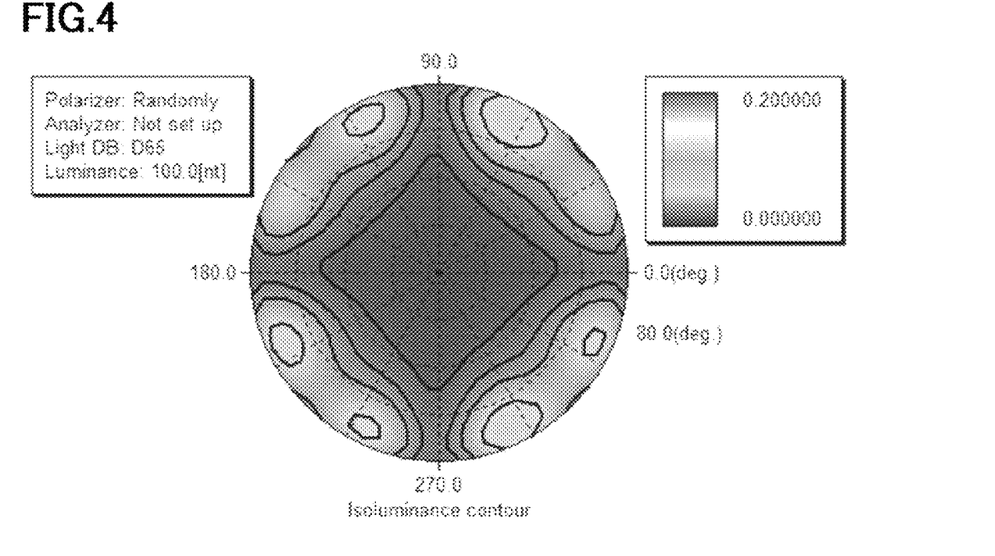
FIG. 4 is a diagram showing the result of simulation analysis of equal transmittance curves.

When the retardation (which is the product of birefringence $\Delta n$ of the liquid crystal material and the liquid crystal layer thickness d) of the liquid crystal element 14 of embodiment 1 shown in FIG. 1 was set to approximately 300 nm, simulation analysis of the optimization of viewing angle characteristics when no voltage was applied was carried out. As a result, for example, when the Rth of the positive C-plate was set to −91 nm and the Re of the positive A-plate was set to 140 nm, equal transmittance curves shown in FIG. 4 was obtained. The contour lines of the equal transmittance curves shown in FIG. 4 are 0.01%, 0.02%, 0.03%, 0.05% and 0.1% from the inside. Hereinafter, similar simulation analysis results are similarly defined. As shown in the figure, it can be seen that excellent viewing angle characteristics in which light leakage is suppressed in all directions are shown.

According to the embodiment as described above, due to the effect of the viewing angle compensation primarily by the second optical plate (positive C-plate), even when the incident light advances in a wide angular range, the contrast of the light distribution pattern to be emitted forward of the vehicle can be improved.

Embodiment 2

Figure 5:
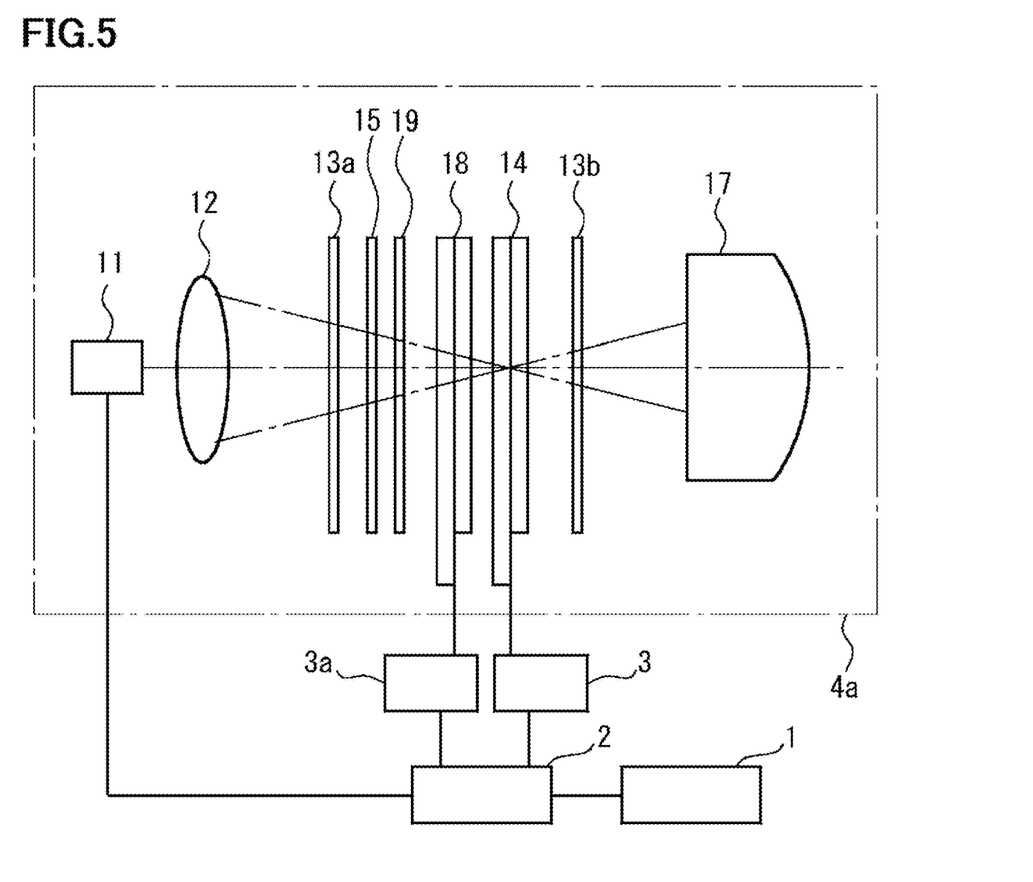
FIG. 5 is a diagram showing the configuration of a vehicular lamp system according to embodiment 2.

FIG. 5 is a diagram showing the configuration of a vehicular amp system according to embodiment 2. In the vehicular lamp system shown in FIG. 5, based on an image of the surroundings (for example, the front) of an own vehicle taken by a camera 1, an image recognition process is performed and the presence or absence of a target object (for example, an oncoming vehicle, a preceding vehicle, a pedestrian, etc.) is detected by a control part 2. Then, according to the position of the target object, a liquid crystal element 14 and 18 of a lamp unit 4a is controlled and selective light irradiation is performed by a liquid crystal driving part 3 and 3a. Since the main difference from embodiment 1 is the the lamp unit configuration, only the configuration which differs will be described in detail below, and the description of the configuration which are common between the two embodiments will be omitted.

The lamp unit 4a is disposed at the front part of the vehicle for light irradiation, and is configured to include a light source 11, a condensing lens (condensing optical system) 12, a pair of polarizers 13a, 13b, a liquid crystal element 14, an optical plate 15, a projection lens (an imaging projection optical system) 17, a liquid crystal element 18, and an optical plate 19. The difference from the lamp unit 4 of embodiment 1 is that the optical plate 16 (positive C-plate) is replaced by the vertically aligned liquid crystal element 18 and the optical plate 19 which is a negative C-plate. In the present embodiment, the pair of polarizers 13a, 13b, the liquid crystal element 14, the optical plate 15, the liquid crystal element 18, and the optical plate 19 correspond to an "optical shutter part."

The liquid crystal element 18 is driven by a driving voltage supplied from the liquid crystal driving part 3a to modulate light incident from the light source 11 through the condensing lens 12 or the like. The liquid crystal element 18 has a plurality of light modulation regions (pixel regions), and is capable of modulating light for each light modulation region. In the present embodiment, as the liquid crystal element 18, a vertically aligned liquid crystal element in which the alignment state when no voltage is applied is vertical (or substantially vertical) is used. The liquid crystal element 18 is disposed between the liquid crystal element 14 and the optical plate 19. Detailed configuration of the liquid crystal element 18 will be described later (refer to FIG. 7).

The optical plate 19 is a negative C-plate and is disposed between the optical plate 15 and the liquid crystal element 18. Here, when expressed using the definition of the optical plate described above, the negative C-plate is an optical plate of Nz=+∞. The combination of the optical plate 19 and the liquid crystal element 18 allows this embodiment to replace the function of the optical plate 16 in embodiment 1. Here, since an optical plate having negative biaxial optical anisotropy with an in-plane retardation Re (=(nx−ny)×d) of several nm or less is also substantially equivalent to the negative C-plate, in the present specification, an optical plate having such biaxial optical anisotropy is also included as the negative C-plate.

In order to obtain the same Δn·d (retardation) as the optical plate 16 which is a positive C-plate, it is necessary to reduce the cell thickness d and/or the refractive index anisotropy Δn of the liquid crystal element 18 which is difficult to realize. Therefore, after setting Δn·d as small as possible within a practical range, by subtracting Δn·d from the optical plate 19 which is a negative C-plate, optical compensation can be obtained as a whole.

Here, when using a negative C-plate, a cycloolefin polymer (COP) resin, a triacetyl cellulose (TAC) resin, an inorganic material etc. can be used as its raw material. Among these, since the COP resin and the inorganic material are relatively superior in heat resistance, they are preferable in a vehicular lamp using strong light. The heat resistance of the lamp unit 4a can be enhanced by using a negative C-plate as the optical plate 19 made of these materials.

In the lamp unit 4a of the present embodiment, light is modulated in each light modulation region of either or both of the liquid crystal element 14 and the liquid crystal element 18, and then the light is emitted through the polarizer 13b and projected by the projection lens 17, thereby allowing various light distribution patterns to be formed in front of the own vehicle. For example, it is possible to form a light distribution pattern in which the region where the preceding vehicle and the oncoming vehicle exist is shielded or dimmed, and in which the other region is irradiated with light.

For example, during normal operation, it is possible to form a light distribution pattern even if only one of the liquid crystal element 14 or the liquid crystal element 18 is driven, and the other liquid crystal element is not being driven. In this case, if the liquid crystal element being driven during normal operation fails, the other liquid crystal element can be driven to perform backup in the event of a failure, for example. In addition, by driving both of the liquid crystal elements 14, 18, it is possible to change the color tone of the light distribution pattern by utilizing ECB (Electrically Controlled Birefringence) effect. Further, two-screen display can be realized by performing separate image formation on each of the liquid crystal element 14 and the liquid crystal element 18.

Figure 6:
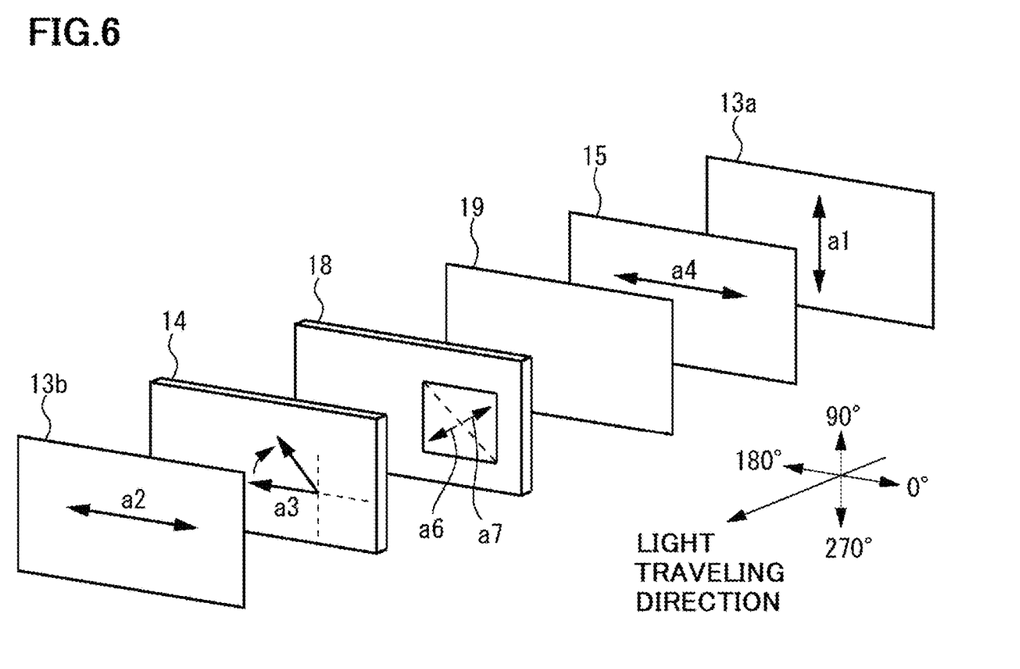
FIG. 6 is a diagram for explaining the optical axes arrangement of each of the liquid crystal elements, each of the optical plates, and each of the polarizers.

FIG. 6 is a diagram for explaining the optical axes arrangement of each of the liquid crystal elements, each of the optical plates, and each of the polarizers. Here, since the difference from embodiment 1 is the existence of the liquid crystal element 18 and the optical plate 19, the description of the other components will be omitted. The liquid crystal element 18 uses a multi-domain alignment in which the alignment direction of liquid crystal molecules of the liquid crystal layer is divided into two when an electric field is applied, and is set such that the alignment direction a6 of one domain is directed to 225° direction and the alignment direction a7 of the other domain is directed to 45° direction, when an electric field is applied. Here, with regard to the method of realizing the multi-domain alignment, various known techniques such as oblique electric field method using slits and ribs, or a method where the alignment processing direction in each region of the alignment film is made different may be used. Further, since the optical plate 19 is a negative C-plate, it may be disposed between the liquid crystal element 18 and the optical plate 15.

Figure 7:
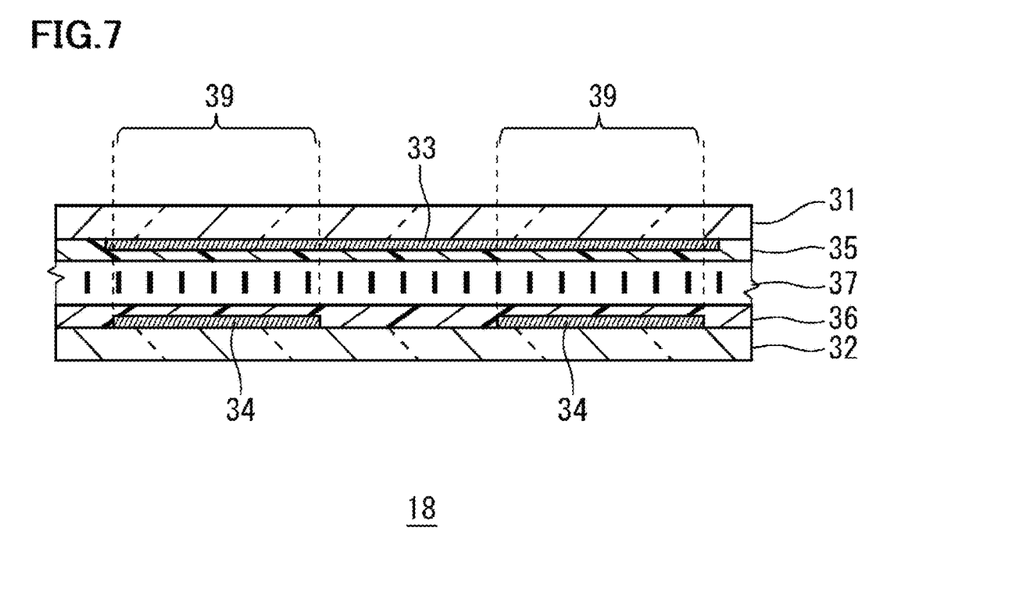
FIG. 7 is a schematic cross-sectional view showing a configuration example of a liquid crystal element.

FIG. 7 is a schematic cross-sectional view showing a configuration example of a liquid crystal element. The liquid crystal element 18 is configured to include a first substrate 31 and a second substrate 32 disposed to face each other, a first electrode 33 provided on the first substrate 31, a second electrode 34 provided on the second substrate 32, a first alignment film 35 and a second alignment film 36 provided on the first substrate 31 and the second substrate 32 respectively, and a liquid crystal layer 37 disposed between the first substrate 31 and the second substrate 32. Here, since the configuration of the liquid crystal element 14 is the same as that of embodiment 1, the description thereof will be omitted.

Each of the first substrate 31 and the second substrate 32 is a rectangular substrate in a plane view, and is disposed to face each other, similar to the first substrate 21 and the second substrate 22 described above.

The first electrode 33 is provided on one surface side of the first substrate 31. Similarly, the second electrode 34 is provided on one surface side of the second substrate 32. Each of the electrodes is configured by appropriately patterning a transparent conductive film such as indium tin oxide (ITO), for example.

Here, as a method of applying a voltage to the first electrode 33 and the second electrode 34, that is, as a method of driving the liquid crystal element, it is possible to properly adopt static drive, duty drive, TFT drive or the like, and particularly, adopting static drive is desirable.

The first alignment film 35 is provided on one surface side of the first substrate 31. The second alignment film 36 is provided on one surface side of the second substrate 32. As each alignment film, an alignment film which regulates the alignment state of the liquid crystal layer 37 to vertical alignment is used. Each alignment film may be subjected to uniaxial alignment treatment such as rubbing treatment. In that case, the direction of the alignment treatment on each alignment film is set to be alternate (anti-parallel), for example. Here, although illustration is omitted, when providing a slit, a rib, etc. and generating an oblique electric field in each electrode, rubbing treatment to each alignment film is unnecessary.

The liquid crystal layer 37 is provided between the first substrate 31 and the second substrate 32. In this embodiment, the liquid crystal layer 37 contains a flowable nematic liquid crystal material having a negative dielectric anisotropy $\Delta\varepsilon$ and contains no chiral material. The liquid crystal layer 37 of the present embodiment is arranged so that the liquid crystal molecules are vertically aligned (or substantially vertically aligned) when no voltage is applied. Here, "vertically aligned" refers to a case where pretilt angle which is the angle between the alignment direction of the liquid crystal molecules and the substrate surface is 90°, and "substantially vertically aligned" refers to a case where pretilt angle is less than 90° but close to 90° (for example, 89°).

Figure 8:
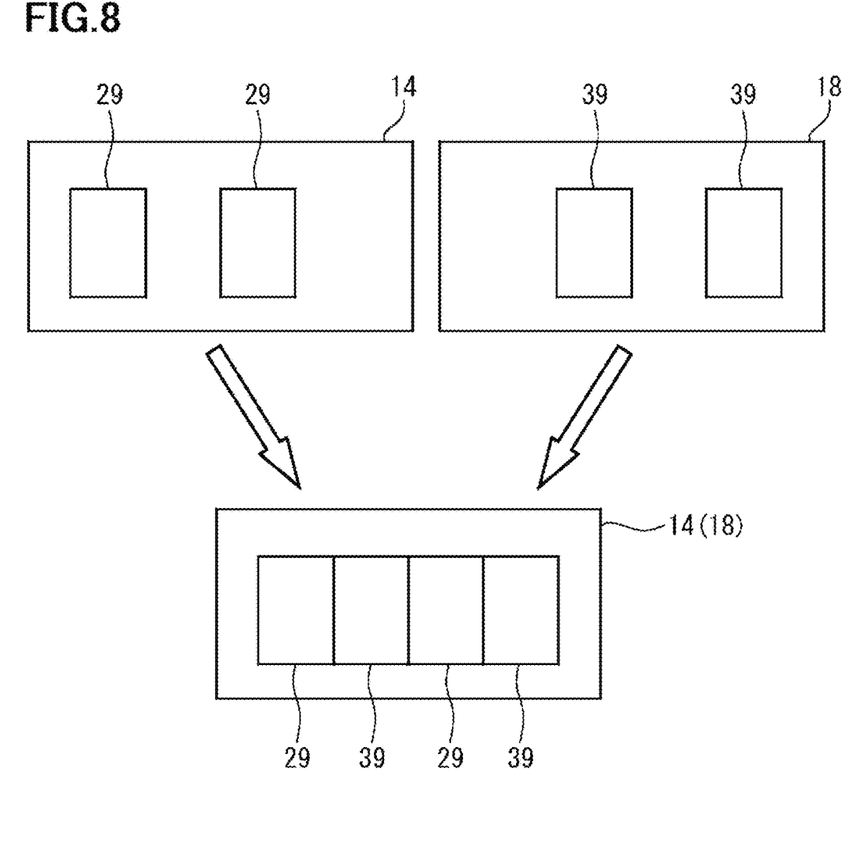
FIG. 8 is a conceptual diagram for explaining a configuration in which light modulation regions are arranged complementarily.

In this liquid crystal element 18, each of the regions capable of changing the alignment direction of the liquid crystal molecules due to the electric field generated by the first electrode 33 and the second electrode 34 becomes a light modulation region 39. By individually controlling the state of the transmitted light for each of the light modulation regions 39, a desired light distribution pattern can be obtained. As shown in a conceptual diagram in FIG. 8, by arranging the light modulation regions 29 of the liquid crystal element 14 and the light modulation regions 39 of the liquid crystal element 18 in a complementary relationship and arranging them without gaps therebetween in a plane view, gaps can be eliminated between the light modulation areas as a whole. Thereby, it is possible to prevent the occurrence of dark lines (dark grid) in the light distribution pattern. Thus, the quality of the light distribution pattern is further enhanced. Here, in the figure, the light modulation regions are arranged in the horizontal direction but the light modulation regions may be arranged in the vertical direction.

Figure 9:
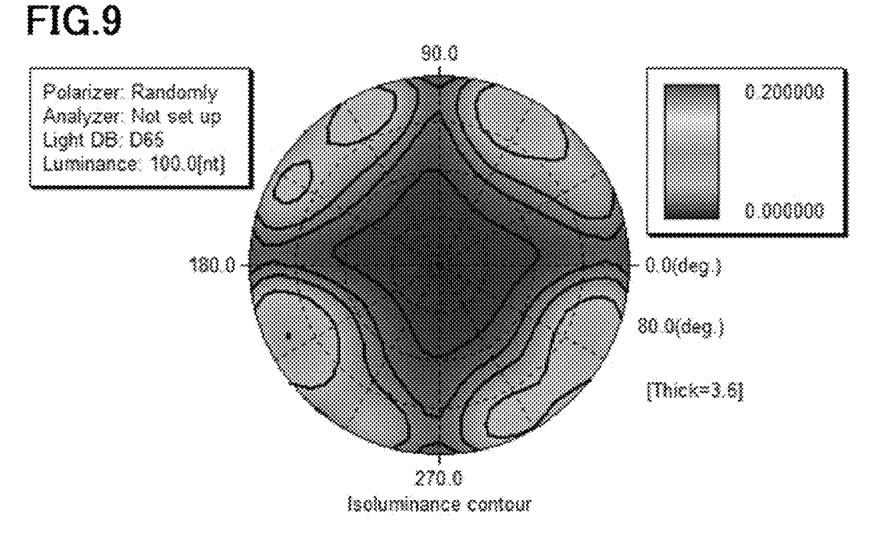
FIG. 9 is a diagram showing the result of simulation analysis of equal transmittance curves.

When the retardation of the liquid crystal element 18 of embodiment 2 shown in FIG. 5 was set to approximately 320 nm, simulation analysis of the optimization of viewing angle characteristics when no voltage was applied was carried out. As a result, for example, when the Rth of the negative C-plate was set to 220 nm and the Re of the positive A-plate was set to 140 nm, equal transmittance curves shown in FIG. 9 was obtained. Although light leakage is slightly more than that of prior art, it can be seen that good viewing angle characteristics was obtained.

Figure 10:
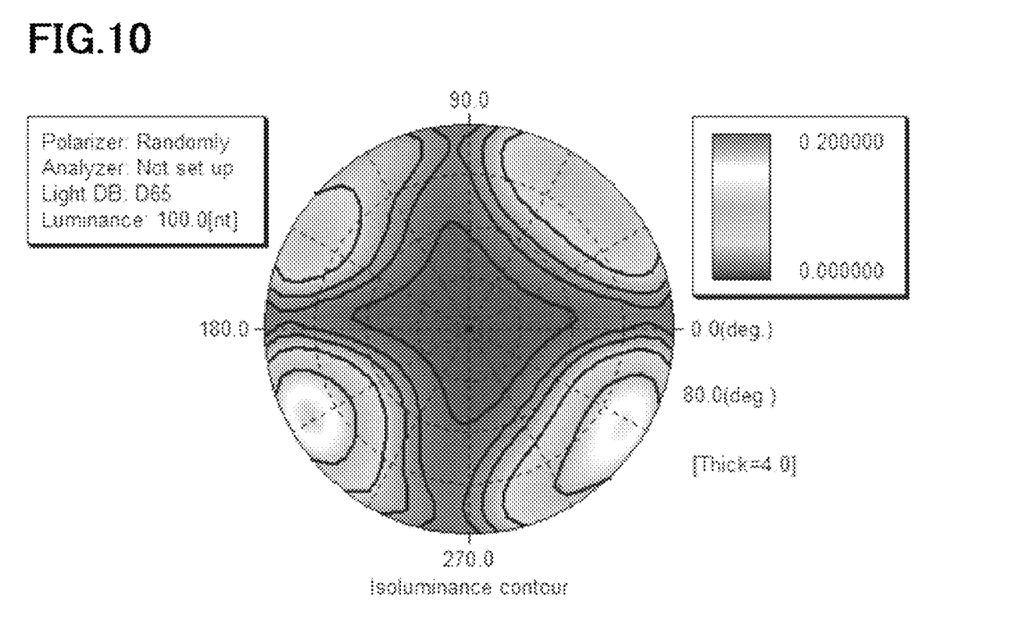
FIG. 10 is a diagram showing the result of simulation analysis of equal transmittance curves.

Here, the positive A-plate can be replaced with another optical plate. For example, a case in which the positive A-plate is replaced with a biaxial film having negative biaxial optical anisotropy (negative biaxial plate) where Nz=1.5 will be described. For example, when stretching norbornene-based cyclic olefin polymer film, this optical film can be obtained only by transverse uniaxial stretching. If the optical film has a slow axis approximately orthogonal to the absorption axis of the adjacent polarizer, then there is an advantage that the optical film can be laminated or bonded to the polarizer by roll-to-roll method. After the replacement, when the retardation of the liquid crystal element 18 of embodiment 2 shown in FIG. 5 was set to approximately 360 nm, simulation analysis of the optimization of viewing angle characteristics when no voltage was applied was carried out. As a result, for example, when the Rth of the negative C-plate was set to 220 nm, and the Re and the Rth of the biaxial film having negative biaxial optical anisotropy were set to 100 nm and 100 nm respectively, equal transmittance curves shown in FIG. 10 was obtained. Although light leakage is slightly more than that of prior art, it can be seen that good viewing angle characteristics was obtained.

Figure 11:
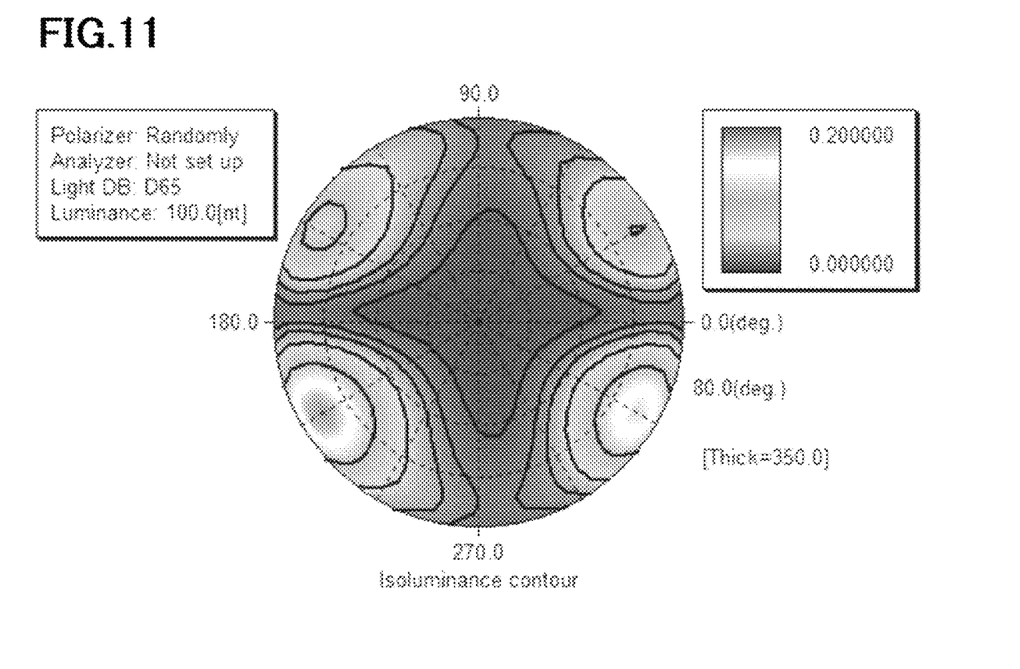
FIG. 11 is a diagram showing the result of simulation analysis of equal transmittance curves.

Next, a case in which the positive A-plate is replaced with a biaxial film having positive biaxial optical anisotropy (positive biaxial plate) where Nz=0.5 will be described. After the replacement, when the retardation of the liquid crystal element 18 of embodiment 2 shown in FIG. 5 was set to approximately 275 nm, simulation analysis of the optimization of viewing angle characteristics when no voltage was applied was carried out. As a result, when the Rth of the negative C-plate was set to 220 nm, and the Re and the Rth of the biaxial film having positive biaxial optical anisotropy were set to 227 nm and 0 nm respectively, equal transmittance curves shown in FIG. 11 was obtained. Although light leakage is slightly more than that of prior art, it can be seen that good viewing angle characteristics was obtained.

Figure 12:
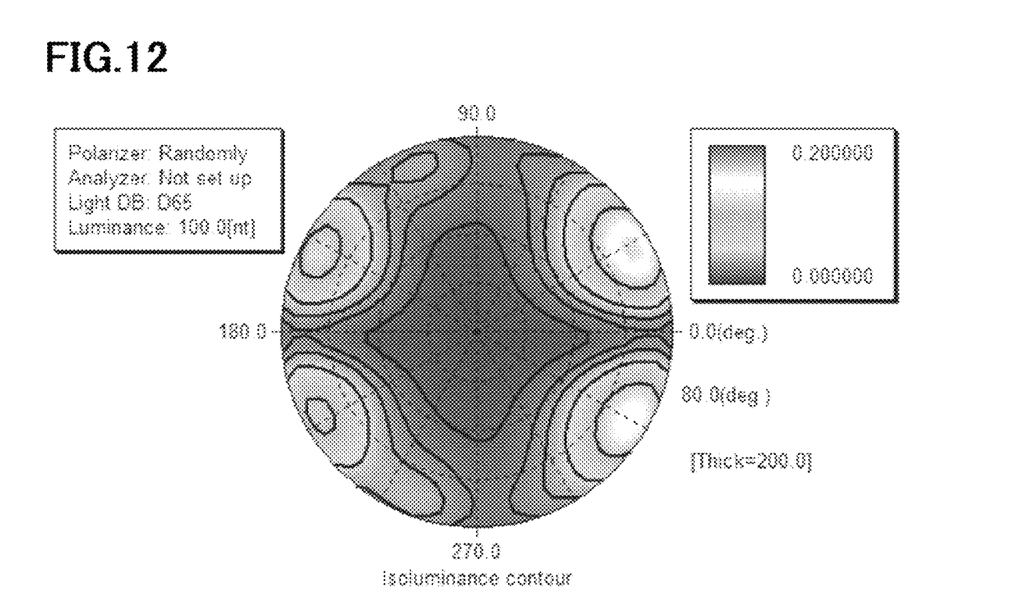
FIG. 12 is a diagram showing the result of simulation analysis of equal transmittance curves.

Next, a case in which the positive A-plate is replaced with a negative A-plate where Nz=0 will be described. After the replacement, when the retardation of the liquid crystal element 18 of embodiment 2 shown in FIG. 5 was set to approximately 230 nm, simulation analysis of the optimization of viewing angle characteristics when no voltage was applied was carried out. As a result, when the Rth of the negative C-plate was set to 330 nm, and the Re of the negative A-plate was set to 125 nm, equal transmittance curves shown in FIG. 12 was obtained. Although light leakage is slightly more than that of prior art, it can be seen that good viewing angle characteristics was obtained.

According to the embodiment as described above, due to the effect of the viewing angle compensation primarily by the liquid crystal element and the second optical plate (negative C-plate), even when incident light advances in a wide angular range, the contrast of the light distribution pattern to be emitted forward of the vehicle can be improved.

It should be noted that this invention is not limited to the subject matter of the foregoing embodiments, and can be implemented by being variously modified within the scope of the present invention as defined by the appended claims. For example, although a multi-domain vertical alignment type liquid crystal element was illustrated as the liquid crystal element 18 in embodiment 2, a mono-domain vertical alignment liquid crystal element may be used. Further, in each of the above embodiments, the target object was detected based on the image captured by a camera, but other means (for example, light detection and ranging (LiDAR), etc.) may be used to capture the target object.

What is claimed is:

1. A lamp unit used for a vehicular lamp system that performs selective light irradiation to the surroundings of a vehicle comprising:
   a light source;
   an optical shutter part that modulates light emitted from the light source; and
   an optical system that projects the light transmitted through the optical shutter part;
   wherein the optical shutter part comprises:
   a pair of polarizers;
   a first liquid crystal element disposed between the pair of polarizers and in which the initial alignment of liquid crystal molecules is horizontally aligned and causes an alignment change in the in-plane direction upon application of an electric field;
   a second liquid crystal element disposed between the pair of polarizers and the initial alignment of liquid crystal molecules is vertically aligned or substantially vertically aligned;
   a first optical plate which is one of a positive A-plate, a negative A-plate, a positive biaxial plate or a negative biaxial plate, disposed between one of the pair of polarizers closer to the light source and the first liquid crystal element or the second liquid crystal element; and
   a second optical plate which is a negative C-plate disposed between the first optical plate and the first liquid crystal element or the second liquid crystal element.

2. The lamp unit according to claim 1:
   wherein the pair of polarizers are arranged such that their absorption axes are substantially orthogonal to each other;
   wherein the first liquid crystal element is disposed such that the alignment direction of the initial alignment is substantially parallel to any one of the absorption axes of the pair of polarizers; and
   wherein the first optical plate is configured as the positive A-plate and the slow axis of the positive A-plate is arranged substantially parallel to the alignment direction of the initial alignment of the liquid crystal element.

3. The lamp unit according to claim 2:
   wherein the color of light transmitted through the optical shutter part is variably set using a change in birefringence of the second liquid crystal element due to voltage application.

4. The lamp unit according to claim 2:
   wherein the first liquid crystal element has a plurality of first light modulation regions;
   wherein the second liquid crystal element has a plurality of second light modulation regions; and
   wherein the first liquid crystal element and the second liquid crystal element are arranged such that the plurality of first light modulation regions and the plurality of second light modulation regions are arranged complementarily in a plane view.

5. The lamp unit according to claim 1:
   wherein the color of light transmitted through the optical shutter part is variably set using a change in birefringence of the second liquid crystal element due to voltage application.

6. The lamp unit according to claim 5:
   wherein the first liquid crystal element has a plurality of first light modulation regions;
   wherein the second liquid crystal element has a plurality of second light modulation regions; and
   wherein the first liquid crystal element and the second liquid crystal element are arranged such that the plurality of first light modulation regions and the plurality of second light modulation regions are arranged complementarily in a plane view.

7. The lamp unit according to claim 1:
   wherein the first liquid crystal element has a plurality of first light modulation regions;
   wherein the second liquid crystal element has a plurality of second light modulation regions; and
   wherein the first liquid crystal element and the second liquid crystal element are arranged such that the plurality of first light modulation regions and the plurality of second light modulation regions are arranged complementarily in a plane view.

* * * * *